G. MOORE.
PROCESS OF REPLACEMENT.
APPLICATION FILED OCT. 19, 1914.
1,231,410. Patented June 26, 1917.
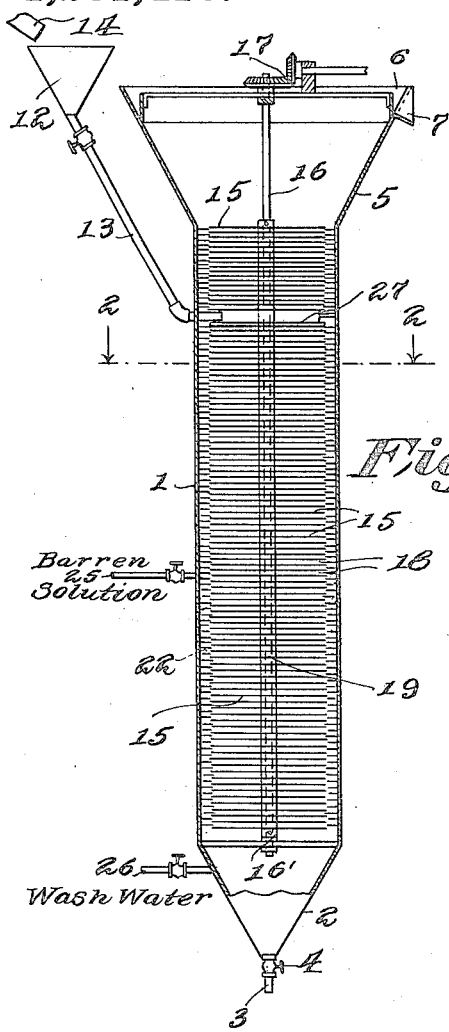
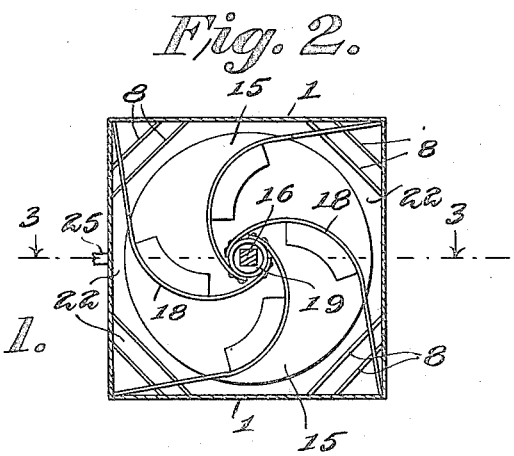
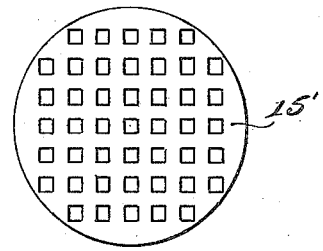
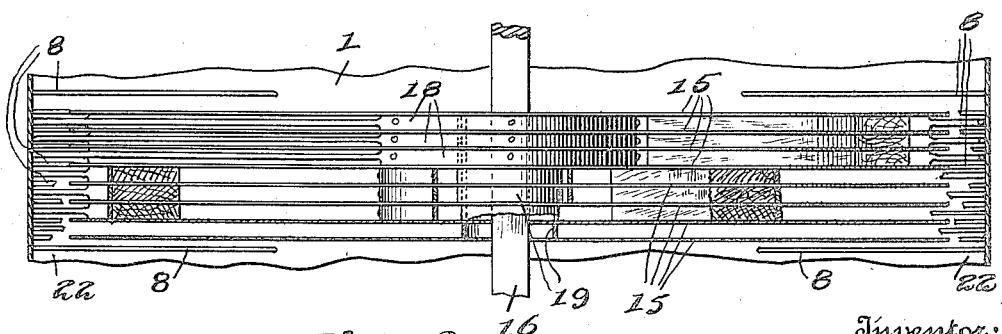
Witnesses:
H. H. Lybrand
C. H. Fesler
Inventor:
George Moore
By Edgar M. Kitchin
his Attorney.

UNITED STATES PATENT OFFICE.

GEORGE MOORE, OF JOPLIN, MISSOURI.

PROCESS OF REPLACEMENT.

1,231,410. Specification of Letters Patent. Patented June 26, 1917.

Application filed October 19, 1914. Serial No. 867,439.

*To all whom it may concern:*

Be it known that I, GEORGE MOORE, a citizen of the United States, residing at Joplin, in the county of Jasper and State of Missouri, have invented certain new and useful Improvements in Processes of Replacement; and I do hereby declare the following to be a full, clear, and exact description of the invention, such as will enable others skilled in the art to which it appertains to make and use the same.

This invention relates to improvements in the art of replacing, in solids of pulp, fluid of greater dissolved contents by fluid of less or no dissolved contents, and the primary object in view is the effective attainment of the replacement in a minimum time.

To the end of accomplishing this object, it is a further object of the invention to accelerate the settling rate of solids in pulp, and a still further object to maintain the increased speed of settling of solids while maintaining substantially complete replacement.

Another object in view is the taking advantage of the fact that solids of slime pulp when settled into a coagulated mass and then dislodged in a fluid gravitate at a greatly augmented speed over that of the settling rate of suspended particles.

A further object is to hasten coagulation of uncoagulated solids of pulp and precipitation of coagulated masses of solids in a body of fluid which is obtained by providing in such body a zone of travel and substantially quiet zones communicating with the zone of travel.

Other objects are to laminate a mass of pulp for reducing the required distance of travel for any given solid in arriving in a settled state, to avoid the delay in settling of a solid incident to passing through other settled or partly settled solids, and to maintain an avenue for precipitation of masses of coagulated solids offering less resistance to gravitation of such masses than a similar column of pulp in a volume thereof would ordinarily offer.

A still further object is the prevention of masses of coagulated solids carrying with them contained fluid of relatively great dissolved contents into fluid of less dissolved contents or no dissolved contents, one illustrative method of obtaining this result consisting of sufficiently interfering with the gravitation of large coagulated masses of solids for giving opportunity for the fluid, through which the solids are descending, to penetrate the solids and take the place therein of the fluid of greater dissolved contents and thereby drive such fluid of greater dissolved contents out of the solid and cause it to remain in or substantially in the body of like fluid. Such process of interchange of fluids is herein known as replacement.

With these and other objects in view, as will in part be hereinafter stated and in part become apparent, the invention comprises certain novel steps and combinations of such steps in replacement processes as will hereinafter more fully appear and subsequently be particularly pointed out in the appended claims.

To facilitate completeness of disclosure, reference will be had to the details of one specific and illustrative mode of operation in connection with an apparatus preferred for use in carrying out the invention, which apparatus is delineated in the accompanying drawing, in which:

Figure 1 is a diagrammatic showing.

Fig. 2 is an enlarged cross section taken on the plane indicated by line 2—2 of Fig. 1.

Fig. 3 is a still further enlarged fragmentary, vertical section taken approximately on the plane indicated by line 3—3 of Fig. 2.

Fig. 4 is a detail view of a reticulated settler plate.

Referring to the drawing by numerals, 1 indicates a container or tank terminating at its lower end in the hopper discharge bottom 2 discharging through a pipe 3 controlled by a valve 4. To the upper end of the tank is fixed a hopper 5 provided with an internally-arranged decanting trough 6 about its upper end for the discharge of clarified liquid through an outlet 7. A pipe 13 provided with a hopper 12, leads into container 1 at an intermediate point in the length of the container, and a supply launder or pipe 14 delivers to hopper 12 pulp to be treated at approximately the rate of treatment in tank 1, the supply being controlled by apparatus and from a source not shown.

Arranged within the tank 1 are superimposed plates 15 which are arranged as near together as practicable, for the purpose of treatment of pulp as hereinafter specified, the distance in actual practice being of course variable within a reasonable range;

but should be approximately a half of an inch. This distance of vertical spacing of the superimposed plates 15 will be substantially identical regardless of the actual diameter of the plates, since it is desirable, and one of the objects attained by this invention, to so divide pulp as to increase the rate of precipitation both by affording a very short distance for a settling solid to travel to a supporting surface and by preventing interference with such settling through the presence of quantities of partially settled solids through which the particular particle would have to pass in reaching a resting place. Each of the plates 15 is preferably of very thin sheet metal, but the substance of the several plates is immaterial, so far as their functions are concerned. A preferably, axially-arranged shaft 16 extends substantially throughout the tank, and is appropriately journaled at its end portions, the shaft being geared, as at 17, to a source of power not illustrated, for being rotated at a slow rate. The shaft 16 is squared or otherwise formed so that said plates 15, which have square openings through which the shaft extends, will revolve with the shaft. Between each two of the plates 15 is arranged a scraper 18, each of which consists of a series of volute arms, which arms are fixed at their inner ends to a ring 19 loosely surrounding shaft 16. A scraper 18 also rests on the uppermost plate 15. The outer end of each scraper arm 18 rests against the side of container 1. As the shaft 16 revolves the several plates 15, the scraper arms 18, remaining stationary, act to scrape settled and coagulated solids collected on the several plates 15 to the peripheries thereof and to discharge the solids in clots or drops down the avenue 22 formed between the peripheries of plates 15 and the walls of the container 1 and surrounding the plates, it being understood, of course, that in operation the entire container is filled with liquid through which the coagulated masses of solids descend by gravity, the rate of descent being much more rapid than the descent of separate solids of pulp suspended in the liquid. It is immaterial whether the plates or the scraper arms move, provided the movement is relative. Obstructions, as rods 8, are arranged at different parts of avenue 22 which interfere with or deflect the falling clots, causing them to change their forms and size and to present new surfaces to the replacing solutions.

To avoid excessive friction between the several plates and scraper, particularly in the lower portions of the tank due to the weight of superimposed plates and scrapers, the scrapers are preferably rendered buoyant, as by being formed at least in part of buoyant material and the displacement of each is approximately sufficient to float itself and the plate 15 immediately above, so that very little accumulated weight is sustained by the lower plates. Or any mechanical means of support for the parts may be employed. The lower end of shaft 16 is provided with a sleeve 16' adapted to sustain the lowermost plate and to enable lifting all of the scrapers and plates with shaft 16 bodily out of container 1 when desired, after rods 8, which are removably inserted through the walls of tank 1, have been withdrawn.

If the avenue 22 is left as a substantially free unobstructed passageway, relatively large clots or masses of solids discharged from upper plates 15 descend without material change in form, and therefore, carry with them quantities of solutions of greater dissolved contents into the solutions of less dissolved contents. To avoid this difficulty, deflecting means are provided which sufficiently break up the masses in the course of their descent to allow replacement of their contained fluid by the fresh fluids into which they are falling. At the same time, the deflecting is done with as little agitation as possible so as to prevent the solids from going back into suspension. Obviously various forms of deflecting means may be employed, one of the simplest consisting of the rods 8.

When pulp is being supplied to tank 1 which contains some sand, counter currents would be liable to occur as a result of direct descent of the sand along that part of the avenue 22 into which the pipe 13 discharges. To avoid this, I extend the discharge end of pipe 13 a considerable distance into the container 1 and deliver the discharge from the pipe onto a plate 27 which distributes the sand approximately evenly about the avenue 22 so that approximately the same quantity of sand will be descending at different points at once, and therefore, will not effect any over-balancing along one line with respect to other parts of the avenue 22.

In carrying out the process while employing the apparatus above described, tank 1 is filled with pulp to be treated, or with water followed by pulp, or the container 1 may be filled with a cyanid solution or other appropriate liquid and dry ore supplied to hopper 5 so as to form a pulp to be treated. Barren solution is supplied through a pipe 25 to container 1 at an intermediate point, and water or washing fluid is supplied to a pipe 26 preferably at the lower end of container 1. The solids of the pulp in container 1 upon arriving therein, spread throughout portions of the container and begin at once to precipitate onto the several plates 15. The liquid of the pulp rises to the decanting trough 6, clarifying as it rises, and is discharged through pipe 7. If the liquid thus decanted is not clarified to the degree desired, it may be retreated for further removal of suspended solids. As the solids settle on the plates 15 they are scraped off or otherwise dislodged and descend down avenue 22 in the uprising current of replacing fluid. The coagulated solids thus precipitated strike the rod 8 and excessively rapid precipitation of the coagulated masses of solids is prevented thereby and the masses are somewhat broken so as to afford opportunity for replacement of fluid of greater dissolved contents present in the solids by fluid of less dissolved contents into which the solids are descending until the solids, entering the wash water, have the contained fluid replaced by fluid of substantially no dissolved contents. The solids then continue down to and are discharged through the outlet. The rate of movement of the plates 15 is so slow as not to cause arms 18 to appreciably agitate the contained pulp, and therefore, the movement of plates 15 does not interfere with the settling rate of solids. As the masses of coagulated solids discharged off of the peripheries of the surfaces 15 are descending down the avenue 22, the cyanid solution from pipe 25 slowly ascends for preventing the liquid of the pulp from descending with the solids, and the water from pipe 26 slowly ascends for preventing excessive descent of the cyanid solution so as to prevent diffusion of the valuable liquid down into the practically valueless water, so that the fluid discharged with the solids through pipe 3 will be of minimum dissolved contents. It is to be observed that the square area across the path of travel in the avenue 22 is sufficiently small relative to the bulk of mass being treated to prevent the valuable liquid entering with the pulp from becoming excessively diffused down past the pipe 25 and for preventing the cyanid from becoming diffused in the contained fluid down past the pipe 26.

Plates 15 serve essentially as means for maintaining substantially quiet zones, that is, zones in which whatever currents occur, if any, are such as permit settling of suspended uncoagulated solids into coagulated masses. The effect of this is important in the present invention. It is obvious that if a counter current of fluid is maintained past suspended uncoagulated solids at the rate of settling of such solids in still liquid, the solids will have relative travel only and will actually remain stationary, so that to enable actual travel of the solids the rate of travel of the fluid must be reduced, and the actual travel of the solids will of course increase with the proportional decrease in speed of the counter current. Ordinarily an equal rate of actual travel of the two elements would be maintained by keeping the counter current flow at one-half the rate of settling of uncoagulated suspended solids in still fluid. Since the rate of precipitation of masses of coagulated solids is many times faster than that of uncoagulated solids, the counter current in the practising of the present invention can be maintained many times faster than that of a counter current through which uncoagulated suspended solids are settling, whereby greatly increased capacity in a container of a given size is afforded by the present invention. The quiet zones are quiet relative to the column or zone of travel of upwardly moving solutions, and the arrangement of quiet zones in a column extending substantially throughout the length of the zone of travel affords opportunity for effective settling of solids including those placed again in suspension by attrition and by breaking of precipitating coagulated solids.

Plates 15 in revolving carry with them certain portions of the surrounding solutions and thus produce horizontal circulatory motion therein which tends to prevent and break up all undesirable circulatory movement in directions other than horizontal, whereby the rise of solutions of the column is caused to be continuous and uniform.

The avenue 22 is not of course to be considered confined to the form shown, but may assume various forms capable of like action, particularly that indicated in Fig. 4, wherein the plate 15' is shown as reticulated, and the mesh may be coarser or finer as found preferable in working different slimes. The apertures in plates 15' form a many times divided channel functioning as channel 22. The spaces immediately above the upper surfaces of the plate 15' between apertures thereof are quiet zones in that at those points opportunity is afforded for settling and coagulation of solids.

What I claim is:

1. In a process of treating pulp, coagulating masses of solids in a column of displacing solution by settling the solids, precipitating such masses of coagulated solids through said column of displacing solutions in a tortuous path while causing the solutions of the column to rise at a rate greater than the rate of settling of the solids before coagulation, and breaking the coagulated masses into smaller masses while moving in the column of displacing solutions.

2. In a process of treating pulp, coagulating masses of solids in a column of displacing solutions by settling the solids, precipitating coagulated solids through such column of displacing solutions while causing the solutions of the column to rise at a rate greater than the rate of settling of the solids before coagulation, and deflecting portions of the coagulated masses of precipitating solids while moving in the column of displacing solutions.

3. In a process of treating pulp, maintaining an upwardly moving column of solution in a body of pulp, maintaining a column of zones of relative quiet extending along and substantially throughout the length of the moving column, settling solids of the pulp in coagulated masses in the quiet zones, precipitating coagulated settled masses of solids in the moving column, and interrupting movement of parts of the masses of solids while in the moving column.

4. In a process of treating pulp, precipitating masses of coagulated solids through a tortuous column of displacing solution rising at a rate greater than the settling rate of said solids before coagulation, and breaking the masses into smaller masses while moving in the column of displacing solutions.

In testimony whereof I affix my signature in presence of two witnesses.

GEORGE MOORE.

Witnesses:
R. M. PARKER,
EDGAR M. KITCHIN.